UNITED STATES PATENT OFFICE.

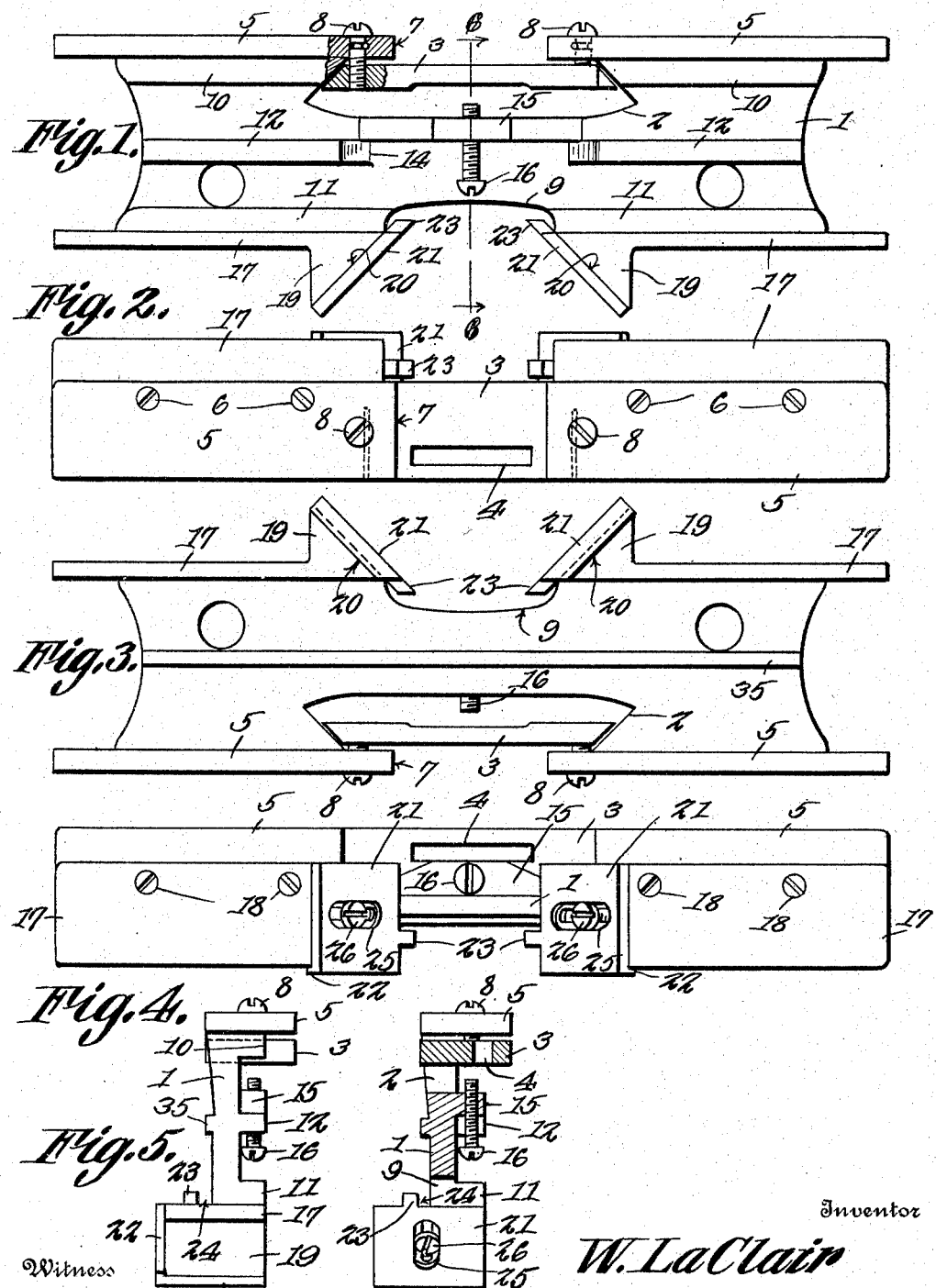

WILLIAM LA CLAIR, OF OAKVILLE, WASHINGTON.

SAW-FILING GAGE.

1,308,247.  Specification of Letters Patent.  Patented July 1, 1919.

Application filed May 7, 1918. Serial No. 233,110.

*To all whom it may concern:*

Be it known that I, WILLIAM LA CLAIR, a citizen of the United States, residing at Oakville, in the county of Grays Harbor and State of Washington, have invented a new and useful Saw-Filing Gage, of which the following is a specification.

It is one object of this invention to provide novel means whereby the raker teeth of a saw may be jointed. Another object of the invention is to provide novel means whereby a file may be held in place to effect a jointing of the teeth of a saw when the device hereinafter described is slid along the saw. A further object of the invention is to provide novel means whereby the slope of the edges of the notches in the raker teeth may be determined. The invention aims to provide a device of the class hereinafter described, wherein the work will at all times be visible, it being unnecessary for the operator to stoop and look underneath parts of the tool or the work.

Changes such as a mechanic might make may be resorted to within the scope of what is claimed, without departing from the spirit of the invention.

In the drawings:—Figure 1 is a side elevation wherein parts are broken away; Fig. 2 is a top plan; Fig. 3 is an elevation showing the opposite side of the device from that delineated in Fig. 1; Fig. 4 is a bottom plan; Fig. 5 is an end elevation; Fig. 6 is a cross section on the line 6—6 of Fig. 1.

The tool claimed comprises a body 1 in one edge of which an opening 2 is formed. A gage plate or file gage 3 is located in the opening 2 and has a slot 4. Top plates 5 are secured at 6 to the body 1 and project laterally beyond one side of the body. The inner ends of the plates 5 are spaced as shown at 7 opposite to the opening 2. Screws 8 are held for rotation but against longitudinal movement in the ends of the plates 5 which overhang the opening 2. There is a recess 9 in the edge of the body 1 opposite to the opening 2. The body 1 has ribs 10 which terminate at the opening 2, and is provided with ribs 11 which terminate at the recess 9. The body 1 is provided with intermediate ribs 12, the inner ends of which are spaced as shown at 14.

The side of a saw may be placed against the ribs 11, 12 and 10, the cutting teeth of the saw abutting against the laterally projecting portions of the plates 5. By means of the screws 8, the gage plate 3 may be raised and lowered to determine the length of the raker teeth. One raker tooth at a time may be inserted through the slot 4 in the plate 3, and when a file is reciprocated in the space 7, the raker tooth may be dressed down to the required length.

The body 1 is provided, below the opening 2, with a lateral lug 15 in which a screw 16 is threaded. A file (not shown) may be clamped between the plate 3 and the upper end of the screw 16.

When the side of a saw is placed against the ribs 11 and 12, the device may be reciprocated along the saw, and the file, bound between the screw 16 and the plate 3, will effect a jointing of the teeth of the saw.

Plates 17 are secured at 18 to the body 1 and terminate at the recess 9, the plates having lugs 19 provided with inclined converging surfaces 20 which slope toward the recess 9. Gages 21 are mounted to slide for adjustment on the surfaces 20 in the direction in which the said surfaces converge. The gages 21 have side flanges 22 which coöperate with the sides of the lugs 19 to direct the straight line sliding movement of the gages. The gages 21 are supplied at their inner ends with reduced projections 23 spaced as shown at 24 from the body 1. There are longitudinal slots 25 in the gages 21, receiving binding screws 26 threaded into the lugs 19.

The gages 21 may be slid on the inclined surfaces 20 of the lugs 19 and be held in adjusted positions by tightening up the screws 26. In this way, the position of the inclined edges of the notches in the raker teeth may be fixed upon. The structure being in the position of Fig. 3, the side of a saw is placed against the edges of the plates 5 and against a longitudinal rib 35 on the side of the body 1, the ends of the teeth of the saw abutting against the plates 17, the teeth of the saw being received in the space 24 shown in Fig. 5. The slant of the edges of the notch in a raker tooth may be determined by means of the gages 21 and if necessary, the said edges may be filed off, the file being reciprocated transversely of the body 1 on one or both of the gages 21.

I claim:

1. In a saw filing gage, a body having an opening and including parts which overhang the opening at the ends thereof and at the outer edge of the body; a gage plate movable in the opening toward and away from the base of the opening and having a slot for the reception of a raker tooth; adjusting devices forming a permanent connection between said parts and the plate and constituting the sole means for adjusting the plate toward and away from the base of the opening; and a member mounted on the body adjacent to the base of the opening, independently of the plate, and movable on the body toward and away from the plate, and coöperating with the plate to constitute a file holder.

2. In a saw filing gage, a body in the form of a plate having a longitudinal edge and provided on said edge with lugs having surfaces which converge toward the longitudinal center of the body; a gage plate adjustable on said surfaces, toward and away from the longitudinal center of the body in converging relation, the gage plates having guide flanges coöperating with the lugs; and means for clamping the gage plates adjustably on the lugs.

3. In a device of the class described, a body provided upon one edge with converging parts; gage members slidable for adjustment on said parts in the direction of the convergence thereof, the gage members converging from their outer ends toward their inner ends and being provided upon their inner ends with reduced projections spaced from one side of the body; and means for holding the gage members in adjusted positions on said parts.

In testimony that I claim the foregoing as my own, I have hereto affixed my signature in the presence of two witnesses.

WILLIAM LA CLAIR.

Witnesses:
ALICE SCARBOROUGH,
O. H. FRY.

Copies of this patent may be obtained for five cents each, by addressing the "Commissioner of Patents. Washington, D. C."